United States Patent

Moretti

[11] Patent Number: 5,213,290
[45] Date of Patent: May 25, 1993

[54] CABLE HOLDER

[75] Inventor: Erminio Moretti, Grenoble, France
[73] Assignee: A. Raymond & Cie, Grenoble, France
[21] Appl. No.: 851,673
[22] Filed: Mar. 12, 1992
[30] Foreign Application Priority Data
Mar. 21, 1991 [DE] Fed. Rep. of Germany ....... 4109206
[51] Int. Cl.⁵ .................................................. F16L 5/00
[52] U.S. Cl. .................................. 248/56; 174/153 G
[58] Field of Search .......................... 248/56, 27.1, 73; 174/656, 153 G, 152 G; 16/2

[56] References Cited

U.S. PATENT DOCUMENTS

| | | | |
|---|---|---|---|
| 2,920,129 | 1/1960 | Rapata | 174/153 G |
| 3,056,852 | 10/1962 | Sachs | 16/2 X |
| 3,065,004 | 11/1962 | Laich | 16/2 X |
| 3,300,163 | 1/1967 | Randolph | 248/56 |
| 4,089,496 | 5/1978 | Mizusawa | 16/2 X |
| 5,118,057 | 6/1992 | Martin et al. | 174/153 G X |

FOREIGN PATENT DOCUMENTS 3544785  6/1987  Fed. Rep. of Germany .

Primary Examiner—Ramon O. Ramirez
Attorney, Agent, or Firm—Finnegan, Henderson, Farabow, Garrett & Dunner

[57] ABSTRACT

A holder for holding a cable or hose passing through an opening in a wall in sealed manner including a cylindrical receiving body part made of a flexible elastic material and an annular holding body part made of an inflexible plastic material. The receiving body part has a front end and a rear end with an axially extending opening therein for receiving the cable or hose and a locking edge extending circumferentially around its outer peripheral surface. The annular holding body part has a front end and a rear end with an opening extending between its ends sized to axially receive the receiving body part. Locking tabs are provided on the front end of the holding body part for anchoring it in the opening in the wall and inwardly extending radial locking noses are provided on the rear end of the holding body part for engagement with locking edge on the receiving body part, whereby when the front end of the receiving body part is inserted into the rear end of the holding body part the two parts are axially locked.

5 Claims, 1 Drawing Sheet

CABLE HOLDER

BACKGROUND OF THE INVENTION

This invention relates to a holder for guiding cables, hoses or similar lines in a sealed manner through the dividing walls between different areas of a motor vehicle and in particular between the passenger compartment and the engine compartment.

A similar type of device is shown in German Patent Publication 35 44 785 A1. This publication shows a holder for such lines which is constructed from a receiving body and a holding body formed of two half shells, the two half shells of the holding body tightly enclosing the receiving body in the closed position. The holding body has on its end facing the dividing wall, mounting tabs with locking hooks at their external ends that engage with the recess in the dividing wall. Sealing between the holding body and the dividing wall is provided by a sealing ring that is located in an annular groove in the holding shells adjacent the dividing wall.

This holder is used in motor vehicle construction for guiding through cable harnesses, brake lines or as a plug-in connection for ignition lines and can be mounted from one side of the dividing wall. It has the disadvantage that the half shells of the holding body first have to be locked around the receiving body, which surrounds the cables, before the entire unit can be anchored by the mounting tabs in the recess of the dividing wall. The cables or hoses, which are then tightly clamped in the receiving body can no longer be readily axially displaced and this can hinder and delay anchoring of the holder in the dividing wall.

Consequently, it is an object of the invention to provide a holder for guiding cables that can be easily assembled around the cable and rapidly anchored in the dividing wall from one side without difficulty.

SUMMARY OF THE INVENTION

The holder for holding a cable or hose passing through an opening in a wall in a sealed manner proposed to achieve this object comprises an annular holding body part made of an inflexible plastic material and a cylindrical receiving body part made of a flexible elastic material adapted to be inserted in an axial direction into said holding body part, said receiving body part having a front end and a rear end with an opening therein extending axially between said ends for tightly surrounding a cable or hose and a locking edge extending circumferentially around an outer peripheral surface thereof and said annular holding body part having a front end and a rear end with an opening extending between said ends sized to receive said receiving body part, locking means on the front end of the holding body part for anchoring it in the opening in the wall and inwardly extending radial locking noses on the rear end of the holding body part for engagement with the locking edge on the receiving body part when the front end of the receiving body part is inserted axially into the rear end of the holding body part to axially lock said parts together.

The holder constructed in this way provides the advantage that during mounting, the holding body part can be initially anchored in the recess of the dividing wall and then the cable can be inserted together with the rubber-like receiving body into the through opening of the holding body and locked in place. This is particularly advantageous if the holding body is to be placed, together with an additional sealing shield, in abutment against noise-damping insulation in the dividing wall, as is generally customary today with dividing walls adjoining the engine space.

In order to make the sealing effect between the receiving body and the holding body more effective, according to a further feature of the invention a plurality of sealing rings are provided on the outer surface of the receiving body that rest against the internal wall of the opening in the holding part. Preferably, the sealing rings are beveled counter to the direction of insertion of the receiving body into the holding body.

The receiving body can be constructed as a closed ring, as in the prior art, or it may have a radial slot in the longitudinal direction of its feed-through opening for laterally inserting the cable into it. In order to increase or ensure the sealing effect in this case, it is preferable, in accordance with a further embodiment of the invention, to provide the radial slot with a zigzag shape in a directional parallel to the axis so that the dividing faces of the slot will be pressed together in firm contact at many points.

BRIEF DESCRIPTION OF THE DRAWINGS

An exemplary embodiment of the invention is illustrated in the drawings and will be explained in greater detail below. In the drawings.

DETAILED DESCRIPTION OF THE INVENTION

Figure 1:
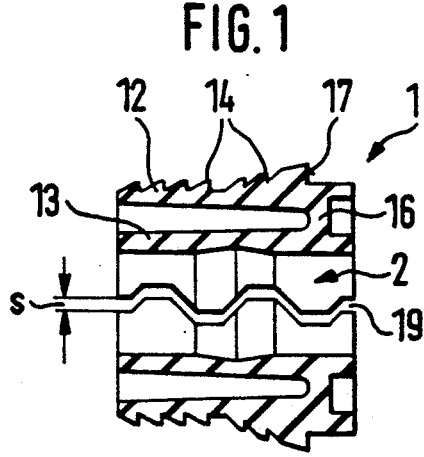
FIG. 1 shows the receiving body part of the cable holder in longitudinal section taken along the line I—I in FIG. 2.

The holder illustrated in the drawings guides cables, hoses or similar lines in a sealed manner through dividing walls between different areas of a motor vehicle, in particular between the passenger compartment and the engine compartment. Guiding the cables through in a sealed manner ensures that neither gases nor noises can pass from the engine compartment into the passenger compartment.

Figure 2:
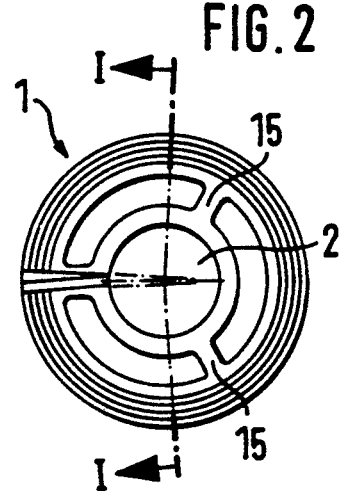
FIG. 2 is a front view of the receiving body part.
Figure 3:
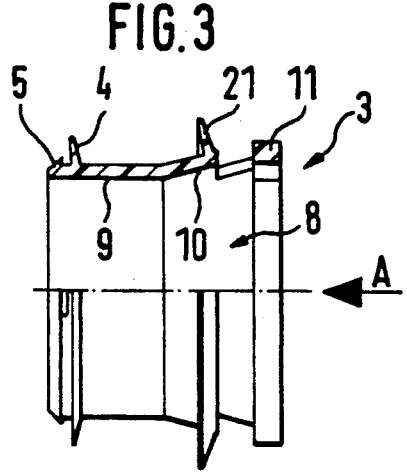
FIG. 3 shows the associated holding body part of the cable holder, partly in side view and partly in longitudinal section taken along the line III—III in FIG. 4.
Figure 4:
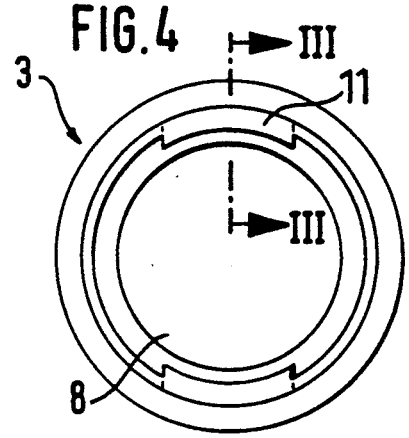
FIG. 4 is a front view of the holding body part taken in the direction of arrow "A" in FIG. 3.

The holder consists of a cylindrical receiving body part 1 made of a flexible elastic material, such as for example cellular rubber, with an axially extending cable feed-through opening 2 (FIGS. 1 and 2) and an annular holding body part 3, made of an inflexible elastic plastic material (FIGS. 3 and 4), which tightly encloses the receiving body 1.

Figure 5:
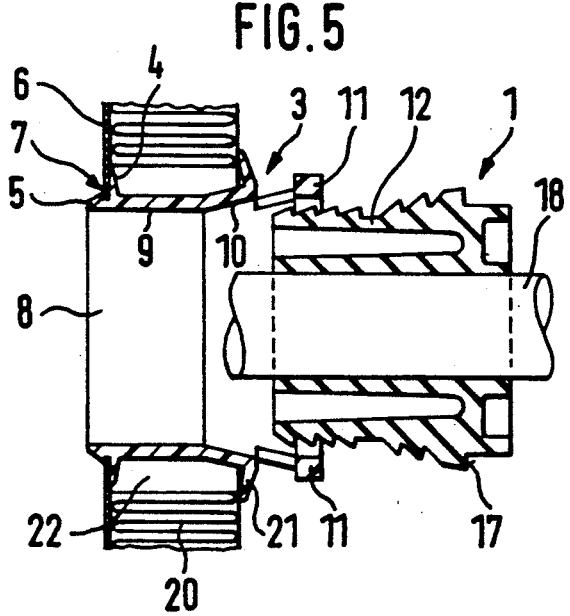
FIG. 5 shows the receiving body part surrounding a cable and its insertion into a holding body part already mounted to the dividing wall.

Holding body part 3 has on its outer circumference near its front end locking means for anchoring the part in the dividing wall. As embodied this means comprises a circumferential extending radial flange or sealing shield 4 and at a distance in front of the shield a plurality of locking tabs 5 which run together conically towards the front edge. Together, they anchor the holding body 3 in an opening in a dividing wall 6 having a size matched to the holding body. Sealing shield 4 will rest on one side of the dividing wall 6, while the locking tabs 5 will engage behind the edge 7 of the opening to anchor the body in place on the wall. See FIG. 5.

Holding body 3 has a feed-through opening 8 between its ends into which is axially inserted receiving body 1. Feed-through opening 8 has at its forward end, where it is anchored to dividing wall 6, an essentially cylindrical inner wall surface 9 which adjoins a conically widening wall surface 10 at its rear or insertion end. In addition, inwardly protruding radial locking noses are provided on the insertion end of the holding body 3 to secure the receiving body 1 in the holding body.

Figure 6:
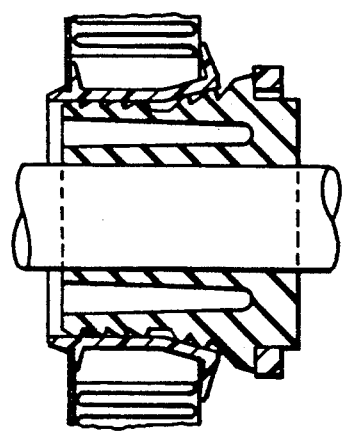
FIG. 6 shows the assembled holder in the installed state.

Receiving body 1 is essentially of cylindrical shape having an outer wall 12 sized to fit into the feed-through opening 8 of the holding body 3 and an inner wall 13 forming the cable feed-through opening 2. Like the inner walls 9 and 10 of the holding part, it is slightly wider at its rear end than at its front end. A plurality of sealing rings or circumferential barbs 14 are preferably provided on the outer peripheral surface of wall 12 that rest against the inner walls 9 and 10 of the opening 8 of holding part 3 when the parts are assembled together. Inner wall 13 and outer wall 12 of the receiving body 1 are connected to one another in the axial direction of feed-through opening 2 by a plurality of radially extending webs 15 and at the body's widened end in the transverse direction by an annular wall 16 so that the feed-through opening 8 of the holding body 3 is completely sealed (FIG. 6) after the receiving body is inserted into the holding body. Sealing rings 14 are beveled in this case counter to the insertion direction for easy insertion of the receiving body.

Just forward of its widened or rear end, receiving body 1 has a locking face or edge 17 extending circumferentially around its outer peripheral surface which is offset in a collar shape and, in the inserted state of the receiving body 1, latches against or locks behind the locking noses 11 of the holding body 3, so that the receiving body 1 is axially fixed in the holding body 3.

For easy installation of a hose or cable 18 in the receiving body 1, preferably it has in the longitudinal direction of cable feed-through opening 2, a radial slot 19 which, for better sealing, extends in a zigzag pattern in a direction parallel to the axis of the holder. The gap width "S" of the radial slot 19 is dimensioned so that it will close completely in the pressed-together and installed state of the receiving body 1. In other words, the two sides of the gap will be tightly held against one another.

Since the dividing wall 6 adjoining the engine compartment is usually provided with a noise-damping insulating layer 20, the holding body 3 can be also provided with a sealing shield 21, at the required distance behind sealing shield 4 so that the second sealing shield 21 will extend over the insulating layer 20 in the mounted state of the holding body 3. The external diameter of the sealing shield 21 is also larger than the sealing shield 4 so that the recess 22 in the insulation, which is necessary to permit passage of the sealing shield 4, is completely covered by the sealing shield 21.

I claim:

1. A holder for holding a cable or hose passing through an opening in a wall in sealed manner comprising an annular holding body part made of an inflexible plastic material and a cylindrical receiving body part made of a flexible elastic material adapted to be inserted in an axial direction into said holding body part, said receiving body part having a front end and a rear end with an opening therein extending axially between said ends for tightly surrounding a cable or hose and a locking edge extending circumferentially around an outer peripheral surface thereof and said annular holding body part having a front end and a rear end with an opening extending between said ends sized to receive said receiving body part, the opening in said holding body part having a cylindrical inner wall surface adjacent its front end and a coaxially, extending conically widening inner wall surface adjacent its rear end, locking means on the front end of the holding body part for anchoring it in the opening in the wall and inwardly extending radial locking noses on the rear end of the holding body part for engagement with the locking edge on the receiving body part when the front end of the receiving body part is inserted into the rear end of the holding body part to axially lock said parts together, said receiving body part having a plurality of sealing rings on its outer peripheral surface that seal against said inner wall surfaces of the opening in the holding body part in the inserted position.

2. The holder of claim 1, wherein the locking edge of the receiving body part is located adjacent its rear end.

3. The holder of claim 1, wherein the sealing rings are beveled counter to the insertion direction.

4. The holder of claim 1, wherein the receiving body part has in the axial direction of its opening a radial slot permitting lateral insertion of the cable into said opening.

5. The holder of claim 4, wherein the radial slot runs in a zigzag pattern in a direction parallel to the axis of the opening.

* * * * *